United States Patent
Griffioen et al.

[11] Patent Number: 6,024,387
[45] Date of Patent: Feb. 15, 2000

[54] TUBE CONNECTOR FOR CONNECTING TUBES INTENDED FOR INSTALLING CABLES THEREIN

[75] Inventors: Willem Griffioen, Ter Aar; Henk Nijstad, The Hague, both of Netherlands

[73] Assignee: Koninklijke KPN N.V., Groningen, Netherlands

[21] Appl. No.: 08/867,074

[22] Filed: Jun. 2, 1997

[30] Foreign Application Priority Data

May 31, 1996 [NL] Netherlands ............................ 1003249

[51] Int. Cl.$^7$ .................................................. F16L 25/00
[52] U.S. Cl. ............................ 285/14; 285/340; 285/412; 403/305
[58] Field of Search ...................... 285/257, 369, 285/417, 340, 13, 14, 322, 924; 403/305, 307, 300

[56] References Cited

U.S. PATENT DOCUMENTS

| | | | |
|---|---|---|---|
| 1,059,560 | 4/1913 | Parker | 403/307 X |
| 1,145,679 | 7/1915 | Grigg | 285/129.2 X |
| 1,671,979 | 6/1928 | Cook | 403/305 |
| 1,822,056 | 9/1931 | Noble | 285/340 |
| 1,970,673 | 8/1934 | Rea | 403/305 |
| 2,158,757 | 5/1939 | Kuestermeier | 285/340 |
| 2,523,716 | 9/1950 | Parr | 285/369 X |
| 2,530,700 | 11/1950 | Jewell et al. | 285/369 X |
| 2,649,105 | 7/1953 | Stout et al. | 285/13 X |
| 2,679,414 | 5/1954 | Hornschuch | 403/307 |
| 3,580,617 | 5/1971 | Ehrenberg | 285/340 |
| 3,995,897 | 12/1976 | Paskert | 403/300 X |
| 4,073,514 | 2/1978 | Pate | 285/340 X |
| 4,346,923 | 8/1982 | Smith et al. | 285/340 |
| 4,640,576 | 2/1987 | Eastwood et al. | |
| 5,171,045 | 12/1992 | Pasbrig | 285/322 X |
| 5,248,169 | 9/1993 | Barbe et al. | 285/369 X |
| 5,588,685 | 12/1996 | Folkers | 285/369 X |
| 5,647,681 | 7/1997 | Chen | 403/300 X |

FOREIGN PATENT DOCUMENTS

| | | |
|---|---|---|
| 0108590 A1 | 5/1984 | European Pat. Off. . |
| 0287225 A1 | 10/1988 | European Pat. Off. . |
| 0292037 A1 | 11/1988 | European Pat. Off. . |
| 0318280 A1 | 5/1989 | European Pat. Off. . |
| 0349344 A2 | 1/1990 | European Pat. Off. . |
| 0645860 A1 | 3/1995 | European Pat. Off. . |
| 2573165 | 5/1986 | France . |
| 0205301 | 9/1959 | Germany ................... 285/14 |
| 682691 A5 | 10/1993 | Switzerland . |
| 0019854 | 10/1895 | United Kingdom .......... 285/417 |
| 0318751 | 9/1929 | United Kingdom .......... 285/340 |
| 2157019 | 10/1985 | United Kingdom . |

Primary Examiner—Eric K. Nicholson
Assistant Examiner—John R. Cottingham
Attorney, Agent, or Firm—Frishauf, Holtz, Goodman, Langer & Chick, P.C.

[57] ABSTRACT

A tube connector comprising an elongate hollow body with an opening at both ends for receiving the end of a tube of a pair of tubes to be coupled to each other, which tube connector comprises means for providing, upon completion of the connection between the connector and the tubes to be connected, a passage for air from the interior of at least one of the tubes to the surroundings.

The use of such connectors in installing glass fiber cables or bundles in a tube line consisting of more than one tube by means of a blowing technique has as an advantage that the course of the pressure gradient along the tube line is more linear than in the case where the connectors couple the successive tubes completely hermetically.

14 Claims, 1 Drawing Sheet

TUBE CONNECTOR FOR CONNECTING TUBES INTENDED FOR INSTALLING CABLES THEREIN

BACKGROUND OF THE INVENTION

This invention relates to a tube connector comprising an elongate hollow body with an opening at both ends for receiving the end of a tube of a pair of tubes to be coupled to each other.

Such a tube connector is known, for use in electricity conduits, from CH-A-682.691.

It is also known to install telecommunication cables, in particular glass fiber cables, in ducts laid underground, by blowing in combination with pushing. Besides telecommunication cables, flexible glass fiber bundles can be installed in subducts by means of blowing. These techniques have been respectively described in; for instance, E-P-A-0.292.037 and EP-A-0.108.590.

If by means of an installation unit a glass fiber cable or bundle is to be installed over several tube sections, it is known to connect such tube sections by means of tube connectors suitable therefor. Such a tube connector is described, for instance, in EP-A-0.349.344. This known connector comprises a hollow cylindrical body and is provided on opposite sides with means in the form of a clamping ring and an O-ring to realize an airtight coupling between the tube sections, in order that no air pressure that is being used for the purpose of blowing is lost through leakage at the coupling.

A drawback of the known connector is that it is rather costly and that it has a rather large external diameter relative to the external diameter of the tubes to be connected. This can be objectionable if in a small space, for instance when installing several tube sections in a larger surrounding duct, many couplings are to be arranged in one place and also when coupled tubes are to be manipulated, in particular when this is to be done in a limited space, because then an unduly large connector can get stuck.

A problem in installing glass fiber cables and fiber bundles is, generally, that due to the non-linear pressure gradient prevailing in the tube the blowing force that is exerted on the cable or bundle in the initial portion of the tube is smaller by about a factor of 2 than if the pressure gradient were linear. As a consequence, the length of cable that can be installed is reduced by about a factor of two. In the case of glass fiber cables this problem can be solved by exerting supplemental pushing forces on the cable, as has been described in EP-A-0.292.037. In the case of flexible fiber bundles, however, this is not possible because these exhibit a phenomenon known by the name of "buckling".

SUMMARY OF THE INVENTION

The object of the invention is to provide a tube connector which does not have the drawbacks of the known connectors, that is, which is cheap and small, and which further offers the possibility of at least partly compensating the non-linearity of the pressure gradient.

To that end, the invention provides a tube connector of the aforementioned type, characterized in that the tube connector comprises means for providing, upon completion of the connection between the connector and the tubes to be connected, a passage for air from the interior of at least one of those tubes to the surroundings.

The invention is based on the surprising insight that a cheap connector of small dimensions, which connector, owing to the absence of O-rings, the allow ability of greater tolerances, etc., does not connect the tubes to be connected together in a completely airtight manner, can at least partly compensate the non-linearity of the pressure gradient precisely by virtue of the occurrence of air leakage.

The air passage may comprise an air gap between the receiving opening of the connector and the external diameter of the tube to be received therein, and can also be purposely provided in the central portion of the connector where the two tube sections meet. In principle, it is sufficient for the air passage to be operative when the tube line is under pressure.

It is noted that, for instance from EP-A-0.318.280, an apparatus is known for blowing an optical fiber into a tube. The known apparatus consists of an elongate tube to which on one side the tube is coupled in which the fiber will be installed and to which on the other side a hypodermic tube is coupled via which the fiber is inserted into the apparatus. The apparatus further comprises a side connection, located upstream of the end of the hypodermic tube located in the elongate tube, for the purpose of connecting a source of compressed air, and side connections located downstream of that end, for the purpose of discharging a controllable amount of the compressed air. The fiber is sucked from the hypodermic tube by means of a venturi effect and the lateral discharges are set in such a manner that this effect is obtained. Accordingly, this apparatus does not involve a tube connector such as that of the present invention and the lateral discharges of this apparatus achieve an entirely different effect than the air leakage enabled by the tube connector of the present invention.

BRIEF DESCRIPTION OF THE DRAWINGS

In the following, the invention will be further described on the basis of an exemplary embodiment, with reference to the drawings, in which.

DETAILED DESCRIPTION

Figure 1:
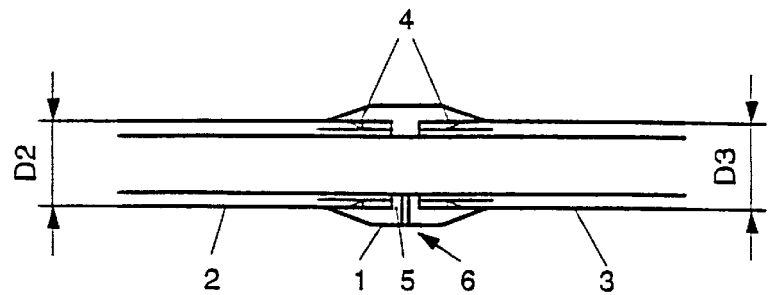
FIG. 1 is a cross section of a connector according to the invention.

FIG. 1 shows a tube connector according to the invention with an elongate, hollow, preferably cylindrical body 1 having on one side an opening for receiving the end of a tube section 2 with an outside diameter $D_2$ and on the other side an opening for receiving the end of a tube section 3 with an outside diameter $D_3$. The diameters $D_2$ and $D_3$ can, but need not, be equal to each other. Provided on the inside wall of the cylindrical body 1 are for instance metal barb-shaped projections 4 which in a manner known per se prevent a tube end from sliding back after it has been introduced into the connector body 1. Arranged centrally in the body is an annular ridge 5 which on either side thereof forms a stop for the ends of the tubes 2 and 3.

It will be clear to those skilled in the art that the connector according to FIG. 1 can be manufactured at a very low cost price and, owing to the small outside diameter thereof, enables compact bundling of coupled tubes or manipulation of a coupled tube in a narrow space. If it should happen that a coupling has to be undone, it can be simply cut loose and be replaced with a new coupling.

As appears from FIG. 1, an air passage opening 6 is formed in the annular ridge 5, which opening forms a connection between the interior of the tubes 2 and 3 and the surroundings. The purpose of this opening will be explained with reference to FIGS. 2 and 3.

To prevent entry of water into the tube via an air passage 6, or through an air passage between the outside wall of the tube and the opposite inside wall of a connector end, it is possible to arrange a valve in the passage 6, or to arrange a flexible sleeve over or a flexible lip on the transition between the tube end and the connector. The valve, sleeve or lip closes off the passage or the transition hermetically at a normal pressure and provides a passage for "leaking" air at excess pressure.

Figure 2:
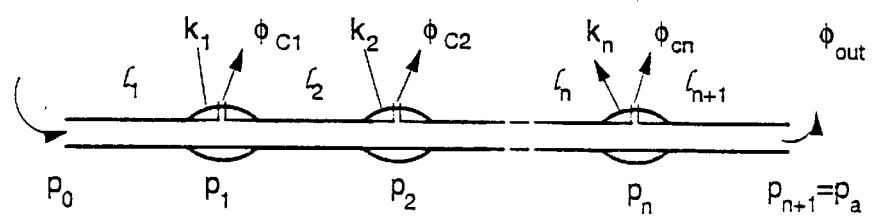
FIG. 2 is a schematic representation of a number of tube sections coupled by means of the connector according to the invention.

FIG. 2 schematically shows a number of tube sections $l_1$, $l_2 \ldots l_n$, $l_{n+1}$ which are successively coupled to each other by means of a tube connectors, which connectors are designated by $k_1, k_2 \ldots k_n$. At the inlet opening of tube section $l_1$ prevails a pressure $p_0$, which is generated by means of a compressor. At the outlet opening of tube section $l_{n+1}$ prevails a pressure $p_{n+1}$ which is equal to the atmospheric pressure $p_a$. At the location of each coupling prevails a respective pressure $p_1, p_2 \ldots p_n$. If in the arrangement according to FIG. 2 the tube connectors k are of a conventional type, for instance of the type described in EP-A-0.349.344, which provides an airtight seal between the tube sections, the course of the pressure as a function of the position x in a tube of a length L is as shown in graph 1 of FIG. 3. It shows that the absolute value of the pressure gradient in the initial portion of the tube line is less than it is towards the end, which is disadvantageous in respect of the maximum achievable installation length. For further information on this, reference is made to the book "Installation of optical cables in ducts" by W. Griffioen, Plumettaz, Bex (CH), 1993.

Figure 3:
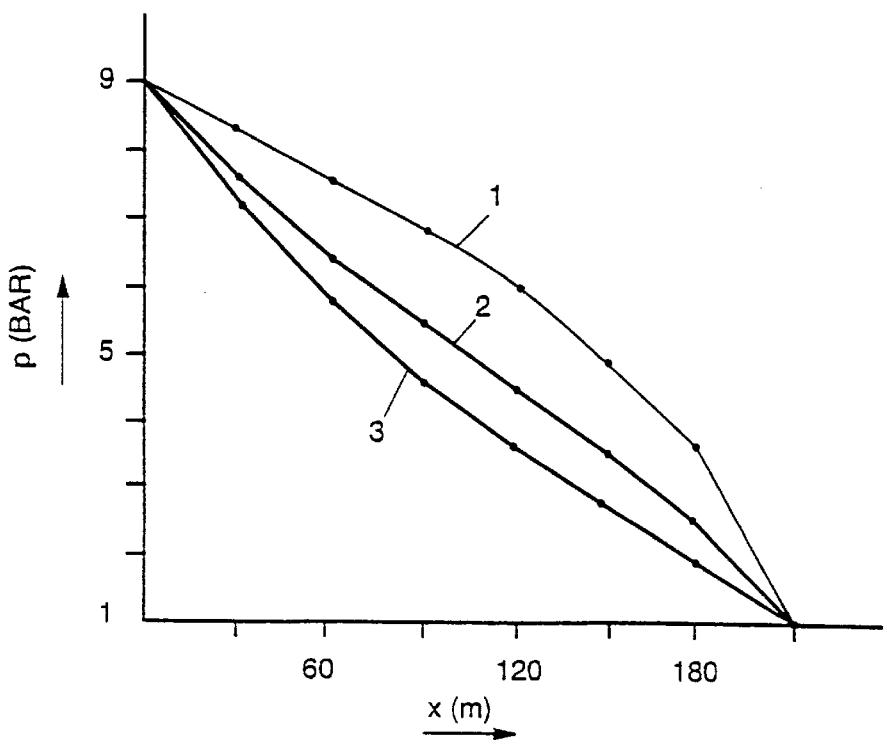
FIG. 3 is a graph of the course of the pressure in a conventional tube and in a tube portion according to FIG. 2.

In FIG. 3, graph 2 shows the course of the pressure in the case where tube connectors according to the invention of the type shown in FIG. 1 are arranged in the tube line according to FIG. 2. It appears that if the passage 6 is properly dimensioned, a virtually linear pressure gradient can be obtained with the connectors.

In FIG. 3, graph 2 shows the course of the air pressure with optimum linearity and graph 3 shows the course of the air pressure in the case where the air passages 6 have the maximum allowable magnitude.

In graphs 2 and 3 the absolute value of the gradient at the beginning of the tube line increases according as the air passage openings become larger, but the absolute value of the gradient towards the end of the tube line decreases further according as the air passage openings become larger. In the case of air passages of a size that results in graph 2, the maximum blowing installation length is achieved, because the pressure gradient is approximately the same throughout the tube line. In graph 3 an increase of the blowing installation length relative to graph 1 is obtained as long as the absolute value of the gradient at the end of the tube line in graph 3 is greater than that at the beginning of the tube line in graph 1. As soon as the absolute value of the gradient of graph 3 at the end of the tube line is the same as the absolute value of the gradient of graph 1 at the beginning of the tube line, there to longer arises any improvement, and further enlarging the air passage opening is pointless, because this yields a poorer result than when use is made of hermetically sealing connectors.

The optimum magnitude of the diameter of the air passage 6 can be calculated on the basis of FIG. 2, as follows:

The air flow in the tube sections l is generally turbulent:

$$p_i^2 - p_{i+1}^2 = C_1 l_i \phi_v^{7/4} \text{ with } C_1 = 0.48 p_a \frac{\mu^{1/4} \rho^{3/4}}{D^{19/4}} \quad (1)$$

Here D is the inside diameter of a tube section l, $\phi_v$ is the (atmospheric) volume flow, $\mu$ is the dynamic viscosity ($1.8 \times 10^{-5}$ Pa for air) and $\rho$ is the density ($1.3$ kg/m$^3$ for air) of the flowing medium. The air flow through a leak is mostly non-turbulent. If the road length which the medium must travel from the interior of the tube to the surroundings is short, viscous effects will have little influence on the air flow and a shock wave will arise, that is to say, that the limitation of the air flow is formed by the speed of sound c (343 m/s at 20° C. for air) of the flowing medium. A further theoretical exposition on this can be found in the above-mentioned book by W. Griffioen. If such a shock wave occurs in a circular opening with a radius $r_h$, the following applies:

$$p_i = C_2 \phi_{ci} \text{ with } C_2 = \frac{p_a}{0.58 \pi r_h^2 c} \quad (2)$$

In the tubes the leakage flow $\phi_v$ is made up of the sum of $\phi_{out}$ at the outlet and different $\phi_{ci}$'s at the tube connectors. With (1) and (2), it follows that:

$$p_0^2 - p_1^2 = C_1 l_1 \left( \phi_{out} + \frac{1}{C_2} \sum_{i=1}^{n} p_i \right)^{7/4}$$

$$p_0^2 - p_1^2 = C_1 l_1 \left( \phi_{out} + \frac{1}{C_2} \sum_{i=1}^{n} p_i \right)^{7/4}$$

$$p_n^2 - p_{n+1}^2 = C_1 l_{n+1} \phi_{out}^{7/4}$$

From this system of equations, it follows that:

$$p_k^2 = p_0^2 - C_1 \sum_{j=1}^{k} l_j \left( \phi_{out} + \frac{1}{C_2} \sum_{i=j}^{n} p_i \right)^{7/4} \quad (3)$$

In the case of $p_{n+1}$ the right-hand sum in (3) equals zero for j=n+1.

The following numerical example gives an idea of the dimensions at which the connectors can work for cascaded tube sections. Consider a series of seven tube sections of equal lengths of 30 m and an inside diameter of 5.5 mm. These are connected by means of six connectors. The pressure at the beginning is 9 bar (absolute). In the case where the connectors are leak-tight, the upper pressure profile 1 of FIG. 3 is obtained. For a passage opening 6 with a radius of 0.3 mm in a connector follows (iteratively) a free outflow $\phi_{out}$ at the outlet of 1.2 l/s with the associated pressure profile 2 of FIG. 3. The pressure profile has become clearly more linear here. For an opening with a radius of 0.4 mm follows a free outflow $\phi_{out}$ at the outlet of 0.8 l/s with the associated pressure profile 3 in FIG. 3. An opening with the dimensions mentioned is easy to provide. In the foregoing calculation, the assumption was that the seal between the tube section and the connector is substantially airtight. A slit of 0.01 mm and 0.02 mm, respectively, already yields as much leakage as an opening with a radius of 0.3 mm and 0.4 mm, respectively, so that instead of a passage opening 6, a tube end fitted in the connector with clearance can also yield the desired effect.

From the formulae and from the numerical example, the following rules of thumb can be derived.

For the optimum passage opening 6 in the connector:

$$r_h \cong \left(\frac{D^{19/4}}{l}\right)^{4/14} \times \sqrt{\frac{6}{n}}$$

Here l is the average length of a tube section. The radius corresponding to the opening with the maximum allowable size is about 30% higher.

For the maximum gap ΔD between the connector wall and tube wall:

$$\frac{\Delta D}{D} \leq 3\left(\frac{D^5}{l^4}\right)^{1/7} \times \frac{6}{n}$$

The magnitude of the gap is optimal, i.e. the course of the pressure is virtually linear, at approximately half this value.

In summary, the use of the above described connectors of the present invention in installing glass fiber cables or bundles in a tube line having more than one tube by means of a blowing technique advantageously enables the course of the pressure gradient along the tube line to be more linear than in the case where the connectors couple the successive tubes in a completely hermetic manner.

We claim:

1. A tube connector for connecting together a pair of tube sections, said tube connector comprising:
    an elongate hollow body having an opening at both ends for receiving respective ends of the pair of tube sections to be coupled, said ends of the pair of tube sections to be coupled having substantially a same outer diameter; and
    a passage provided in the hollow body for enabling an escape of air from an interior of at least one of the pair of tube sections to be coupled;
    wherein the air passage comprises an opening in a sidewall of the connector having a radius $r_h$ given by:

$$r_h \overset{\leq}{\approx} 1.3\left(\frac{D^{19/4}}{l}\right)^{4/14} \times \sqrt{\frac{6}{n}}$$

where D is an inside diameter of the pair of tube sections to be coupled, l is an average length of the pair of tube sections to be coupled, and n is a number of the tube connectors which are present in an extended tube line.

2. The tube connector according to claim 1, wherein the radius $r_h$ of the opening in the side wall of the connector is given by:

$$r_h \approx \left(\frac{D^{19/4}}{l}\right)^{4/14} \times \sqrt{\frac{6}{n}}.$$

3. A tube connector for connecting together a pair of tube sections, said tube connector comprising:
    an elongate hollow body having an opening at both ends for receiving respective ends of the pair of tube sections to be coupled, said ends of the pair of tube sections to be coupled having substantially a same outer diameter; and
    a passage provided in the hollow body for enabling an escape of air from an interior of at least one of the pair of tube sections to be coupled;
    wherein the air passage comprises a space formed between an inside wall of the connector and an oppositely located outside wall of one of the pair of tube sections to be coupled, and the space has a size ΔD such that:

$$\frac{\Delta D}{D} \leq 3\left(\frac{D^5}{l^4}\right)^{1/7} \times \frac{6}{n}$$

where D is an inside diameter of the pair of tube sections to be coupled, l is an average length of the pair of tube sections to be coupled, and n is a number of the tube connectors which are present in an extended tube line.

4. The tube connector according to claim 3, wherein the size of the space ΔD is such that:

$$\frac{\Delta D}{D} \approx 1.5\left(\frac{D^5}{l^4}\right)^{1/7} \times \frac{6}{n}.$$

5. A tube connector for connecting together a pair of tube sections in a non-fluid-tight manner, said tube connector comprising:
    an elongate hollow body having an opening at both ends for receiving respective ends of the pair of tube sections to be coupled, said ends of the pair of tube sections to be coupled having substantially a same outer diameter;
    a passage provided in the hollow body for positively causing an escape of air from an interior of at least one of the pair of tube sections to be coupled, said passage having a diameter which is substantially smaller than an inner diameter of said tube sections to be coupled; and
    barb-shaped projections provided on an outside portion of the opening at both ends of the tube connector for receiving the respective ends of the pair of tube sections to be coupled.

6. The tube connector according to claim 5, further comprising an annular ridge provided on an inside portion of the hollow body of the tube connector at approximately a middle thereof, said annular ridge forming a stop for the respective ends of the pair of tube sections to be coupled.

7. A tube connector for connecting together a pair of tube sections in a non-fluid-tight manner, said tube connector comprising:
    an elongate hollow body having an opening at both ends for receiving respective ends of the pair of tube sections to be coupled, said ends of the pair of tube sections to be coupled having substantially a same outer diameter;
    a passage provided in the hollow body for positively causing an escape of air from an interior of at least one of the pair of tube sections to be coupled, said passage having a diameter which is substantially smaller than an inner diameter of said tube sections to be coupled; and
    an annular ridge provided on an inside portion of the hollow body of the tube connector at approximately a middle thereof, said annular ridge forming a stop for the respective ends of the pair of tube sections to be coupled;
    wherein the air passage comprises an opening provided in the annular ridge.

8. A tube line comprising a plurality of tube sections which are coupled together by a plurality of tube connectors, wherein each of the tube connectors comprises:

an elongate hollow body having an opening at both ends for receiving respective ends of an adjacent pair of the plurality of tube sections; and an air passage provided in the hollow body for enabling an escape of air from an interior of at least one of the adjacent pair of plurality of tube sections;

wherein the air passage in each of the tube connectors comprises an opening in a sidewall of the connector having a radius $r_h$ given by:

$$r_h \lesssim 1.3 \left( \frac{D^{19/4}}{l} \right)^{4/14} \times \sqrt{\frac{6}{n}}$$

where D is an inside diameter of a given one of the plurality of tube sections to be coupled, l is an average length of the plurality of tube sections, and n is a number of the plurality of tube connectors which are present in the tube line.

9. The tube connector according to claim 8, wherein the radius $r_h$ of the opening in the side wall of each of the tube connectors is given by:

$$r_h \approx \left( \frac{D^{19/4}}{l} \right)^{4/14} \times \sqrt{\frac{6}{n}}.$$

10. A tube line comprising a plurality of tube sections which are coupled together in a non-fluid tight manner by a plurality of tube connectors, wherein each of the tube connectors comprises:

an elongate hollow body having an opening at both ends for receiving respective ends of an adjacent pair of the plurality of tube sections; and an air passage provided in the hollow body for positively causing an escape of air from an interior of at least one of the adjacent pair of the plurality of tube sections, said passage having a diameter which is substantially smaller than an inner diameter of said tube sections;

wherein each of the tube connectors further comprises barb-shaped projections provided on an outside portion of the opening at both ends of the tube connector for receiving the respective ends of the adjacent pair of the plurality of tube sections.

11. The tube line according to claim 10, wherein the air passage in each of the tube connectors comprises a space formed between an inside wall of the connector and an oppositely located outside wall of an adjacent one of the plurality of tube sections, and the space has a size ΔD such that:

$$\frac{\Delta D}{D} \lesssim 3 \left( \frac{D^5}{l^4} \right)^{1/7} \times \frac{6}{n}$$

where D is an inside diameter of a given one of the plurality of tube sections to be coupled, l is an average length of the plurality of tube sections, and n is a number of the plurality of tube connectors which are present in the tube line.

12. The tube line according to claim 10, wherein the size of the space ΔD is such that:

$$\frac{\Delta D}{D} \approx 1.5 \left( \frac{D^5}{l^4} \right)^{1/7} \times \frac{6}{n}.$$

13. The tube line according to claim 12, wherein each of the tube connectors further comprises an annular ridge provided on an inside portion of the hollow body of the tube connector at approximately a middle thereof, said annular ridge forming a stop for the respective ends of the adjacent pair of the plurality of tube sections.

14. A tube line comprising a plurality of tube sections which are coupled together in a non-fluid tight manner by a plurality of tube connectors, wherein each of the tube connectors comprises:

an elongate hollow body having an opening at both ends for receiving respective ends of an adjacent pair of the plurality of tube sections;

an air passage provided in the hollow body for positively causing an escape of air from an interior of at least one of the adjacent pair of the plurality of tube sections, said passage having a diameter which is substantially smaller than an inner diameter of said tube sections; and an annular ridge provided on an inside portion of the hollow body of the tube connector at approximately a middle thereof, said annular ridge forming a stop for the respective ends of the adjacent pair of the plurality of tube sections;

wherein the air passage in each of the tube connectors comprises an opening provided in the annular ridge.

* * * * *